(12) United States Patent
Moens

(10) Patent No.: US 11,092,156 B2
(45) Date of Patent: Aug. 17, 2021

(54) CONTROLLER UNIT FOR CONTROLLING THE SPEED OF A MOTOR DRIVING AN OIL INJECTED COMPRESSOR AND METHOD OF CONTROLLING SAID SPEED

(71) Applicant: ATLAS COPCO AIRPOWER, NAAMLOZE VENNOOTSCHAP, Wilrijk (BE)

(72) Inventor: Wim Moens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 67 days.

(21) Appl. No.: 16/341,469

(22) PCT Filed: Oct. 19, 2017

(86) PCT No.: PCT/IB2017/056491
§ 371 (c)(1),
(2) Date: Apr. 12, 2019

(87) PCT Pub. No.: WO2018/078491
PCT Pub. Date: May 3, 2018

(65) Prior Publication Data
US 2020/0072220 A1 Mar. 5, 2020

Related U.S. Application Data

(60) Provisional application No. 62/412,540, filed on Oct. 25, 2016.

(30) Foreign Application Priority Data

Feb. 2, 2017 (BE) .................................. 2017/5066

(51) Int. Cl.
*F04C 29/00* (2006.01)
*F04C 29/02* (2006.01)
*G05D 23/19* (2006.01)

(52) U.S. Cl.
CPC ........ *F04C 29/0014* (2013.01); *F04C 29/026* (2013.01); *G05D 23/1951* (2013.01);
(Continued)

(58) Field of Classification Search
CPC ................ F04C 29/0014; F04C 29/026; F04C 2270/185; F25B 2700/151; F25B 2600/02; F25B 2700/171; G05D 23/1951
(Continued)

(56) References Cited

U.S. PATENT DOCUMENTS

2004/0074469 A1\* 4/2004 Waters ...................... F01L 1/34
123/198 F
2005/0187690 A1\* 8/2005 Williams ................ F16H 61/14
701/51
(Continued)

FOREIGN PATENT DOCUMENTS

DE 112014004045 T5 7/2016
WO 2007045052 A1 4/2007
(Continued)

OTHER PUBLICATIONS

International Search Report in related PCT Application No. PCT/IB2017/056491, dated Feb. 5, 2018.
(Continued)

*Primary Examiner* — Kenneth M Lo
*Assistant Examiner* — Michael W Choi
(74) *Attorney, Agent, or Firm* — Bacon & Thomas, PLLC

(57) ABSTRACT

A controller unit for controlling the speed of a motor for driving an oil injected compressor, the controller unit including: a data connection; and a first module to receive data
(Continued)

through the data connection. The controller unit includes a processing unit for determining a minimum working speed of the motor on the basis of the measured working pressure, the ambient temperature and a dew point temperature; and a comparator unit to compare the determined minimum working speed with the retrieved working speed of the motor. The processing unit includes a signal generating unit to send a signal to the motor for increasing the working speed of the motor to at least the determined minimum working speed, if the retrieved working speed is lower than the determined minimum working speed.

20 Claims, 2 Drawing Sheets

(52) U.S. Cl.
CPC ..... *F04C 2270/185* (2013.01); *F25B 2600/02* (2013.01); *F25B 2700/151* (2013.01); *F25B 2700/171* (2013.01)

(58) Field of Classification Search
USPC ......................................................... 700/299
See application file for complete search history.

(56) References Cited

U.S. PATENT DOCUMENTS

| | | | |
|---|---|---|---|
| 2005/0198981 A1* | 9/2005 | Arno | F25B 49/025 62/229 |
| 2009/0252632 A1* | 10/2009 | Daniels | F04C 29/026 418/84 |
| 2010/0011869 A1* | 1/2010 | Klosinski | G01F 1/42 73/700 |
| 2010/0166571 A1 | 7/2010 | Van Den Wyngaert et al. | |
| 2011/0043156 A1* | 2/2011 | Powell | F04D 27/0261 318/566 |
| 2013/0045076 A1* | 2/2013 | Andersen | F04D 27/0261 415/1 |
| 2014/0345307 A1 | 11/2014 | Bagley et al. | |
| 2015/0047603 A1 | 2/2015 | Sumilla et al. | |
| 2016/0201961 A1 | 7/2016 | Miyakoshi et al. | |
| 2016/0245536 A1* | 8/2016 | Iwasaki | F24F 11/62 |
| 2019/0136843 A1* | 5/2019 | Kawai | F04B 39/16 |

FOREIGN PATENT DOCUMENTS

| | | |
|---|---|---|
| WO | 2009058975 A1 | 5/2009 |
| WO | 2013033182 A1 | 3/2013 |
| WO | 2015194114 A1 | 12/2015 |

OTHER PUBLICATIONS

Written Opinion in related PCT Application No. PCT/IB2017/056491, dated Feb. 5, 2018.

* cited by examiner

CONTROLLER UNIT FOR CONTROLLING THE SPEED OF A MOTOR DRIVING AN OIL INJECTED COMPRESSOR AND METHOD OF CONTROLLING SAID SPEED

This invention relates to a controller unit for controlling the speed of a motor for driving an oil injected compressor, said controller comprising: a data connection configured to connect the controller unit with measuring means; a first module configured to receive data through said data connection, wherein said data comprises: a measurement of a working pressure of said compressor and a working speed of the motor, said first module further being configured to receive a measured or retrieved ambient temperature value.

BACKGROUND OF THE INVENTION

The condensate formation within an oil injected compressor is a known problem. If such condensate is allowed to form it can damage the quality of oil injected therein or even the casing or the compressor element due to its corrosive effects.

One proposed method of avoiding such risks is the control of the temperature within the compressor by adjusting the flow of injected oil through a mixing valve, as proposed in WO 2007/045,052 A, having ATLAS COPCO AIRPOWER NV as applicant. The method described therein aims at maintaining the temperature of the compressed gas above the dew point by setting the temperature of the lubricating and cooling oil at a desired value and controlling the distribution of such cooling oil though the mixing valve.

While such a proposed method provides a valid solution for overcoming the problem, the piping and the overall structure of the compressor would have to be decided upon its design, such a solution not being feasible for an existing unit without the need of considerable work and costs.

Another aspect worth considering is the complexity of the overall design once such method is implemented, such complexity having an impact on the frequency of the maintenance process and its costs.

SUMMARY OF THE INVENTION

Taking the above drawbacks into account it is an object of the present invention to provide a solution for avoiding the formation of condensate within the compressed gas of an oil injected compressor through an easy to implement solution.

It is a further object of the present invention to provide a cost efficient solution, able to improve the working principle of existing units without the need of undergoing a significant intervention and without the risk of increasing the maintenance costs once such solution is implemented.

Accordingly, the solution proposed aims at considerably improving the efficiency of the unit while increasing the lifetime of the oil injected compressor and its components as well as of the oil used therein.

The present invention solves at least one of the above and/or other problems by providing a controller unit for controlling the speed of a motor for driving an oil injected compressor, said controller unit comprising:

- a data connection configured to connect the controller unit with measuring means;
- a first module configured to receive data through said data connection, wherein said data comprises: a measurement of a working pressure of said compressor and a working speed of the motor;

said first module further being configured to receive a measured or retrieved ambient temperature value;

characterised in that the controller unit further comprises

- a processing unit provided with an algorithm for determining a minimum working speed of the motor on the basis of the measured working pressure, the ambient temperature and a dew point temperature;
- a comparator unit configured to compare the determined minimum working speed with the retrieved working speed of the motor;
- said processing unit further comprising a signal generating unit configured to send a signal to said motor for increasing the working speed of the motor to at least the determined minimum working speed, if said retrieved working speed is lower than the determined minimum working speed.

Because the controller unit uses the measured values of the working pressure and the working speed of the motor, such a controller can be easily installed on any existing units without the need of major interventions for introducing additional piping or fittings.

Typically, an existing compressor makes use of such measured values to adapt the working pattern in order to meet the demand at a user's network and because of this, the controller unit according to the present invention could simply be connected to an existing controller or simply replace such an existing controller, considerably reducing the complexity of implementation within existing functioning units.

Another benefit of the controller unit according to the present invention is the low impact on the productivity of existing units, since the intervention for connecting a controller unit according to the present invention can be done very fast and the improved existing unit can be up and running in a very short time interval.

By maintaining the working speed of the motor at least at the same value as the determined minimum working speed, the controller unit maintains the temperature of the system above or approximately above the condensation point, reducing or even eliminating the risks of condensate to form within the oil injected compressor.

Consequently, the controller unit according to the present invention provides a very easy to implement and cost effective solution for existing compressors, improving the efficiency of such units and increasing the lifetime of the oil used for cooling and lubricating purposes.

It is further known that if such condensate forms within an oil injected compressor, even the compressor element or its casing can experience damages or can even be destroyed due to the corrosive effects of such condensate. By using a controller unit according to the present invention such risks are being minimized or even avoided and the lifetime of the oil injected compressor is increased.

Yet another benefit of the controller unit according to the present invention is that, by using the measured working pressure, a measured or retrieved ambient temperature and the working speed of the motor, the controller unit is actively customizing the working parameters in such a way that the turndown of the oil injected compressor is reduced. By reducing the turndown, the lifetime of the oil injected compressor is increased and its efficiency is maintained.

In the context of the present invention the turndown should be understood as the performance of the oil injected compressor and can be defined as the ratio between the minimum free air delivery and the maximum free air delivery.

The free air delivery should be understood as the volume of air at the compressed air outlet calculated at a pressure of one bar. The minimum free air delivery being determined at a minimum speed of the motor driving the compressor element at which the demand at the user's network is met; whereas, the maximum free air delivery is being determined at a maximum speed of the motor driving the compressor element.

The present invention is further directed to a method of controlling the speed of the motor driving an oil injected compressor, the method comprising at least the following steps:

measuring a working pressure of the oil injected compressor and sending the measured value to a first module of a controller unit;

sending the speed of the motor and a measured or retrieved ambient temperature to said first module;

characterised in that the method further comprises the steps of:

determining a minimum working speed of the motor on the basis of the measured working pressure, ambient temperature and a dew point temperature; and comparing the determined minimum working speed with the retrieved working speed of the motor and, if said retrieved working speed is lower than the determined minimum working speed, increasing the working speed of said motor to at least the determined minimum working speed.

Because the method according to the present invention uses standard measurements and applies a relatively simple algorithm, the lifetime of the oil injected compressor and of the oil used therein is increased through a simple and easy to implement method that does not require additional computational power or non-standard electronic components.

The present invention is further directed to an oil injected compressor configured to apply the method according to the present invention.

In the context of the present invention it should be understood that the benefits presented with respect to the controller unit for controlling the speed of a motor driving an oil injected compressor also apply for the method of controlling the speed of the motor driving an oil injected compressor and to the oil injected compressor applying such a method.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
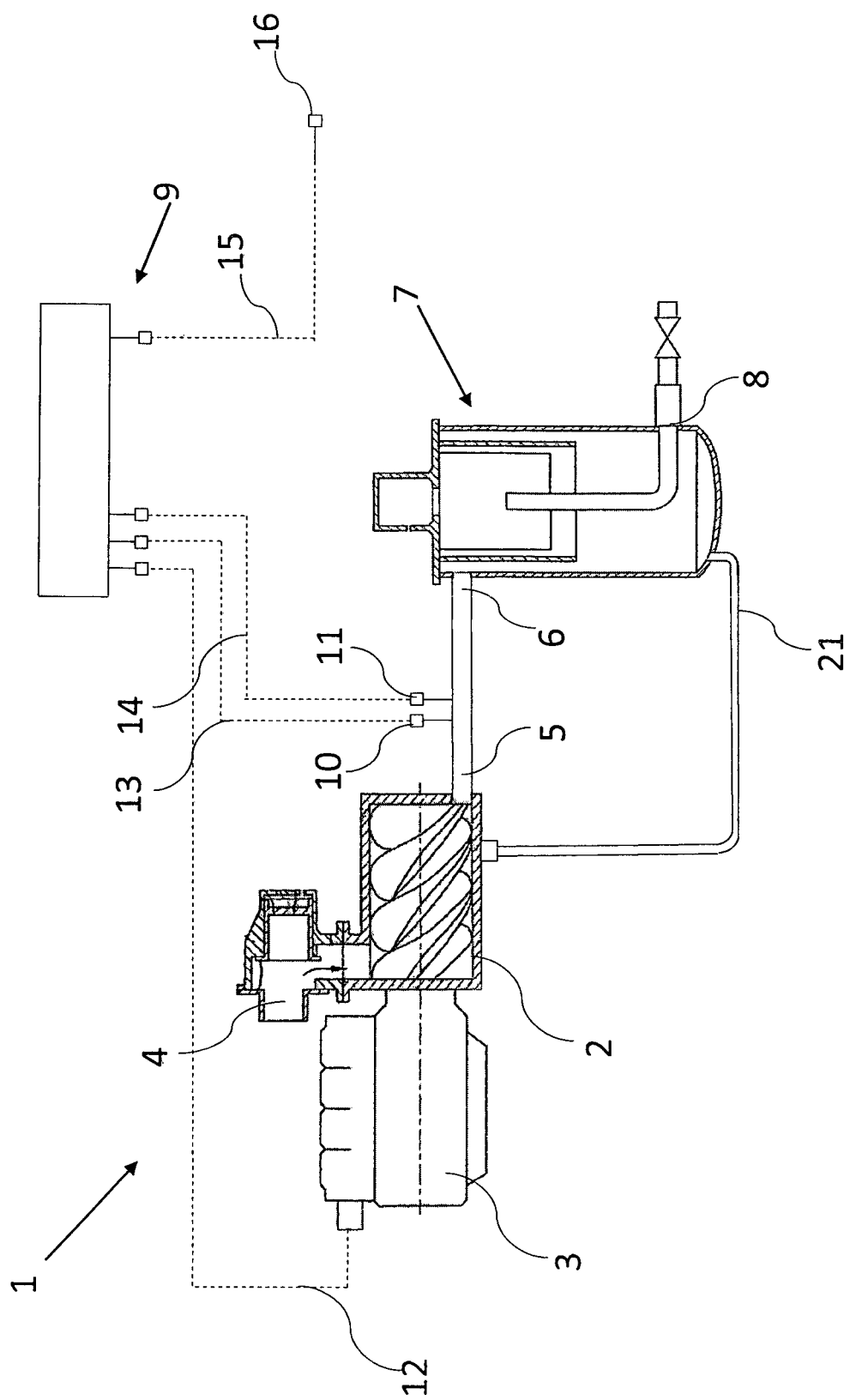
FIG. 1 schematically represents an oil injected compressor according to an embodiment of the present invention.

FIG. 1 illustrates an oil injected compressor 1 comprising at least a compressor element 2 driven by a motor 3. The compressor element 2 having an air inlet 4 through which air at atmospheric pressure is drawn in and a compressed air outlet 5.

The compressed air outlet 5 being further in fluid communication with the inlet 6 of an oil separator 7, wherein the oil is removed from the compressed air.

The oil separator 7 further comprises an outlet conduit 8 through which purified compressed air is supplied to a user's network (not shown).

The oil removed from the compressed air within the oil separator 7 can be further re-injected in the compressor element 2 for lubrication and cooling purposes.

The oil injected compressor 1 further comprises a controller unit 9, receiving measurement data from measurement means 10 and 11, positioned on the compressed air outlet 5.

The controller unit 9 preferably further comprises a data connection 12 with the motor 3 for receiving information concerning the working speed, rpm, of said motor 3.

In the context of the present invention it should be understood that the oil injected compressor may comprise additional components with their additional fittings and piping, such as for example filters removing impurities potentially entering the oil injected compressor, a cooler for cooling the oil extracted from the compressed air before redirecting it to the compressor element 2 and, possibly a dryer for drying the compressed air before guiding it to the user's network. For the sake of the present invention only a minimum number of components have been shown in the accompanying drawing.

Furthermore, in the context of the present invention it should be understood that the functions achieved by the different components included herein, can be also achieved with the help of other components, and the present invention should not be limited to such layout.

In the context of the present invention the oil injected compressor 1 should be understood as the complete compressor installation, including the compressor element 2, all the typical connection pipes and valves, the compressor unit housing and possibly the motor 3 driving the compressor element 2.

In the context of the present invention, the compressor element 2 should be understood as the compressor element casing in which the compression process takes place by means of a rotor or through a reciprocating movement.

In the context of the present invention, said compressor element 2 can be selected from a group comprising: a screw, a tooth, a scroll, a rotary vane, etc.

Returning to the oil injected compressor of FIG. 1, the controller unit 9 according to the present invention is capable of controlling the speed of the motor 3 driving said oil injected compressor 1 through said data connection 12.

Accordingly, it should be understood that said data connection 12 allows a bidirectional data communication: on one hand, the controller unit 9 receives data concerning the speed of the motor 3 and, on the other hand, the controller unit 9 is able to send data to said motor 3 for subsequently controlling its speed.

For receiving measurements from the oil injected compressor 1, the controller unit 9 further comprises at least a first data connection 13 and a second data connection 14, allowing a data exchange between the measurement means 10 and 11 and said controller unit 9.

Preferably, through said first data connection 13 and second data connection 14, the measuring means 10 and 11 provide: a measurement of the working pressure, $p_w$, and of the working temperature, $t_w$, respectively.

Accordingly, the measurement means 10 and 11 can be in the shape of a pressure sensor 10 and a temperature sensor 11 respectively, preferably positioned on the flow conduit of the compressed air outlet 5.

Further, the controller unit 9 is receiving the working speed, rpm, of the motor 3 through data connection 12.

Preferably, the controller unit 9 further makes use of a measured or retrieved ambient temperature, $T_{ambient}$.

If said ambient temperature, $T_{ambient}$, is being measured, the controller unit 9 further comprises a third data connection 15 to a second temperature sensor 16 or to a thermometer, positioned in the vicinity of the oil injected compressor or positioned on the air inlet 4. Said third data connection 15 being a wired or wireless data connection.

In another embodiment according to the present invention, if said third data connection 15 is a wireless data connection, such wireless data connection can be realized through: radio, Bluetooth or through an internet connection, for retrieving the measured or even forecasted ambient temperature, $T_{ambient}$, of the geographical area where the oil injected compressor 1 is located.

Alternatively, the controller unit 9 can further comprise a user interface (not shown), through which a manual input of the ambient temperature, $T_{ambient}$, can be performed by a user of the oil injected compressor 1.

Preferably, the controller unit 9 can comprise four main modules: a first module 17 to which data connection 12, the first data connection 13, the second data connection 14 and the third data connection 15 are linked; a second module 18 comprising a processing unit 18a (not shown) for processing the received data, a third module 19 comprising a comparator unit 19a and a fourth module 20 comprising a signal generating unit 20a.

The processing unit 18a is further provided with an algorithm determining a minimum working speed, $rpm_{min}$, of the motor 3 on the basis of the measured working pressure, $p_w$, received through the first data connection 13, ambient temperature, $T_{ambient}$, received through the third data connection 15 and a dew point temperature, $T_{dew\ point}$, said dew point temperature, $T_{dew\ point}$, being determined on the basis of said measured working pressure, $p_w$, and the measured working temperature, $t_w$, said measured working temperature, $t_w$, being received through the second data connection 14.

The comparator unit 19a, part of the third module 19 is comparing the determined minimum working speed, $rpm_{min}$, with the retrieved working speed, rpm, of the motor 3. Accordingly, the first module 17 is preferably communicating with the second module 18 and the third module 19 in order to send all the relevant needed details.

If, after the comparison, said retrieved working speed, rpm, is lower than the determined minimum working speed, $rpm_{min}$, the processing unit 18a further communicates with the signal generating unit 20a, part of the fourth module 20, for sending a signal to said motor 3 for increasing the working speed, rpm, of the motor 3 to at least the determined minimum working speed, $rpm_{min}$.

In the context of the present invention, it should be understood that any of: said data connection 12, the first data connection 13, the second data connection 14 and/or the third data connection 15 can be a wired or a wireless connection.

Further, said motor 3 can be a fixed speed motor, in which case said motor 3 is provided with an inverter or a valve positioned on the air inlet 4, controlling the volume of air reaching the compressor element 2 and consequently modifying the speed of said motor 3.

In a preferred embodiment according to the present invention, for achieving a simpler design with an easier control thereof, the motor 3 is a variable speed motor.

In another embodiment according to the present invention, the controller unit 9 can be part of the oil injected compressor 1 or can be placed in the vicinity of said oil injected compressor 1 and communicate through a wired or wireless connection with the individual components part of said oil injected compressor 1 such as: the measurement means 9 and 10 and the motor 3.

In yet another embodiment according to the present invention, the controller unit 9 can be in wired or wireless communication with an existing controller (not shown), part of the oil injected compressor 1.

Further, depending on the requirements of the user of said oil injected compressor 1 and possibly on its aging factor, the sampling rate for the retrieval of: the working speed, rpm, the working pressure, $p_w$, the measured working temperature, $t_w$, and of the ambient temperature, $T_{ambient}$, can be any value chosen in the interval between 0.5 µHz (microhertz) and 60 kHz (kilohertz).

As an example and not limiting thereto, such sampling rate can be chosen as any value between 10 hertz and 40 hertz, more preferably, such sampling rate can be chosen as any value between 20 hertz and 30 hertz, even more preferably such sampling rate can be chosen as approximately 25 hertz.

It should be understood that such sampling rate can be different for the different measured or retrieved parameters. For example, if we consider the measurement or retrieval of the ambient temperature, since sudden variations of such parameter are not often encountered, the sampling rate can be chosen towards the beginning of the interval, such as for example at 0.5 µHz, or can even be performed for a number of times per day, such as for example two times per day.

In the context of the present invention, said sampling rate should be understood as the frequency with which the measurements are being performed. In other words it should be understood as the time interval between two subsequent measurements.

In a preferred embodiment according to the present invention, the controller unit 9 receives said measurement of the working pressure, $p_w$, working temperature, $t_w$, and the working speed, rpm, of the motor 3 in real time.

For a more accurate calculation, the algorithm is further configured to compare the measured working temperature, $t_w$, with a determined dew point temperature, $T_{dew\ point}$.

Further, the algorithm can be configured to determine the dew point temperature, $T_{dew\ point}$, by calculation on the basis of the measured working pressure, $p_w$, the ambient temperature, $T_{ambient}$, and a retrieved or determined relative humidity, RH.

The working principle is very simple, and as follows.

During the functioning of the oil injected compressor 1, the working pressure, $p_w$, and the working temperature, $t_w$, are being measured at the compressed air outlet 5. The measured values being sent to a first module of a controller unit 9.

The oil injected compressor comprising a first data connection for sending the measured working pressure, $p_w$, to the controller unit 9; and a second data connection 14, for sending the measured working temperature, $t_w$, to said controller unit 9.

Further the working speed, rpm, of the motor 3 is also identified and sent to the controller unit 9 through a data connection 12.

For an accurate assessment, the controller unit 9 further receives a measured or retrieved ambient temperature, $T_{ambient}$, through a third data connection 15.

Preferably, the above identified measured parameters are being sent to a first module 17 part of the controller unit 9.

Figure 2:
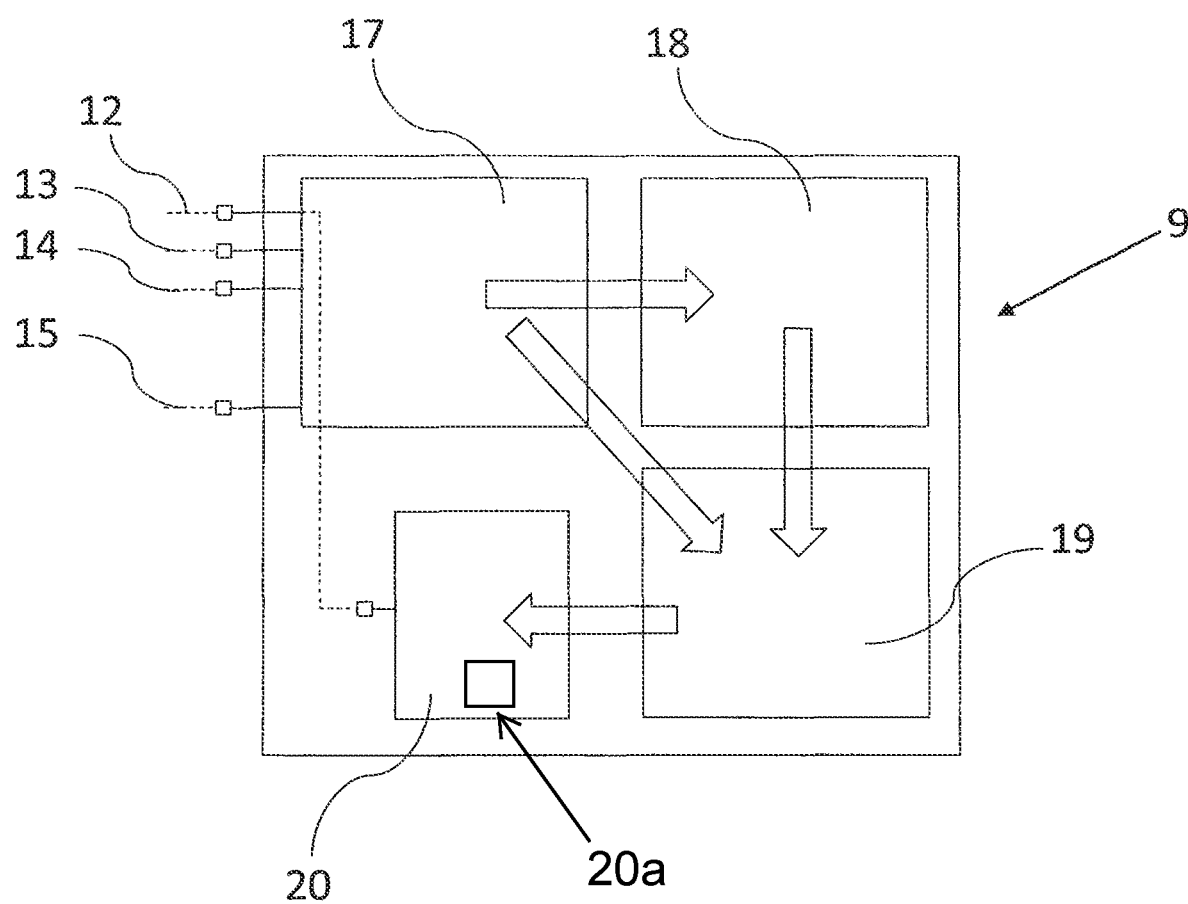
FIG. 2 schematically represents a controller unit according to an embodiment of the present invention.

As illustrated in FIG. 2, the controller unit 9 according to the present invention can comprise a first module 17 receiving the measured parameters, a second module 18 provided with a processing unit 18a for processing the received data, a third module 19 comprising a comparator and a fourth module 20 comprising a signal generating unit 20a.

In the context of the present invention it should not be excluded that the functions performed by said second module 18 and said third module 19 to be integrated in one module.

It should further not be excluded that such controller unit 9 can comprise only one module having a processing unit 18a and all needed electronic interfaces for receiving measurements, generating an electrical signal, sending calculated parameters to other components of the oil injected compressor 1 and ultimately possibly influencing their working parameters.

The controller unit 9 is further using the received measured parameters such as the measured working pressure, $p_w$, and the measured working temperature, $t_w$, to calculate the dew point temperature, $T_{dew\ point}$.

The calculated dew point temperature, $T_{dew\ point}$, and the measured or retrieved ambient temperature, $T_{ambient}$, being further used for determining a minimum working speed, $rpm_{min}$, of the motor 3.

The controller unit 9 is further comparing the retrieved working speed, rpm, of the motor 3 with the determined working speed, $rpm_{min}$, and if the retrieved working speed, rpm, is lower than the determined minimum working speed, $rpm_{min}$, the controller unit will preferably generate an electrical signal through the data connection 12 and will increase the working speed, rpm, of said motor 3 to at least the determined minimum working speed, $rpm_{min}$.

In another embodiment according to the present invention, for a more accurate determination of the minimum working speed, $rpm_{min}$, the controller unit 9 is further considering the temperature of the oil, $T_{oil}$, injected in said oil injected compressor 1. Consequently, in such a case, the minimum working speed, $rpm_{min}$, is determined on the basis of the working temperature, $t_w$, a temperature of the oil, $T_{oil}$, injected in said oil injected compressor 1 and a retrieved or determined relative humidity, RH, said working temperature, $t_w$, being retrieved through the temperature sensor 11 positioned on the compressor air outlet 5, or said working temperature, $t_w$, can be further calculated by applying a known formula. Similarly, the temperature of the oil, $T_{oil}$, being determined through measurements or being calculated through a known formula.

In another embodiment according to the present invention, the controller unit 9 is further comparing the working temperature, $t_w$, with the calculated dew point temperature, $T_{dew\ point}$, and if the working temperature, $t_w$, is lower than the calculated dew point temperature, $T_{dew\ point}$, the controller unit 9 increases the speed of the motor 3, such that condensate is not allowed to form within the oil injected compressor 1.

Furthermore, the oil injected compressor 1 is allowed to function throughout a bigger range of pressures and flow rates measured at the compressed air outlet 5.

As an example, and not limiting thereto, said tolerance can be any value selected between for example approximately −5° C. and approximately +5° C. It should be understood that other values can also apply, depending on the requirements of the oil injected compressor 1 and the demand at the user's network.

In another embodiment according to the present invention, the controller unit 9 can comprise the step of increasing the working speed, rpm, of the motor 3 if the working temperature, $t_w$, is lower than the dew point temperature, $T_{dew\ point}$, to which a tolerance is added.

In another embodiment according to the present invention, the dew point temperature, $T_{dew\ point}$, can be calculated on the basis of the working pressure, $p_w$, ambient temperature, $T_{ambient}$, and the relative humidity, RH.

As an example, and without limiting thereto, one method of calculating said the dew point temperature, $T_{dew\ point}$, is by applying the following formula:

$$T_{dew\ point} = \frac{T_n}{\left[\frac{m}{\log_{10}\left(\frac{p_{wpres}}{Q}\right)} - 1\right]}. \quad \text{(equation 1)}$$

Wherein, Q, m and $T_n$ are empirically determined constants and can be chosen from Table 1, according to the specific temperature range at which the oil injected compressor 1 is running.

TABLE 1

| | Q | m | $T_n$ | max error | Temperature range |
|---|---|---|---|---|---|
| water | 6.116441 | 7.591386 | 240.7263 | 0.083% | (−20° C. to +50° C.) |
| | 6.004918 | 7.337936 | 229.3975 | 0.017% | (+50° C. to +100° C.) |
| | 5.856548 | 7.27731 | 225.1033 | 0.003% | (+100° C. to +150° C.) |
| | 6.002859 | 7.290361 | 227.1704 | 0.007% | (+150° C. to +200° C.) |
| | 9.980622 | 7.388931 | 263.1239 | 0.395% | (+200° C. to +350° C.) |
| | 6.089613 | 7.33502 | 230.3921 | 0.368% | (0° C. to +200° C.) |
| ice | 6.114742 | 9.778707 | 273.1466 | 0.052% | (−70° C. to 0° C.) |

Such empirically determined constants having the following measurement units: Q for example represents the water vapor pressure at 0° C. and has as measurement unit in Table 1: hectopascal (hPa), m is an adjustment constant without a measurement unit, whereas $T_n$ is also an adjustment constant having degrees Celsius (° C.) as measurement unit.

$P_{wpres}$ from equation 1 represents the water vapor pressure converted to atmospheric conditions and can be calculated by applying the following formula:

$$p_{wpres} = \frac{p_w}{p_{atm}} \cdot RH \cdot P_{ws}; \quad \text{(equation 2)}$$

whereby $p_{atm}$ is the atmospheric pressure, RH is the relative humidity either approximated or measured and $P_{ws}$ represents the water vapor saturation pressure.

If the oil injected compressor 1 does not comprise a relative humidity sensor, the approximated relative humidity, RH, can be selected as approximately 100% or lower. On the other hand, if said oil injected compressor 1 comprises such a relative humidity sensor, such sensor would preferably be mounted at the level of the air inlet 4 (not shown) or such sensor could be mounted in the vicinity of the oil injected compressor 1, sending the measurements to the controller unit 9.

The atmospheric pressure, $p_{atm}$, can be measured through a pressure sensor (not shown) positioned on the air inlet 4 or such atmospheric pressure, $p_{atm}$, can be retrieved by the controller unit 9 from a pressure sensor positioned in the vicinity of the oil injected compressor 1, or such atmospheric pressure, $p_{atm}$, can be approximated.

The water vapor saturation pressure, $p_{ws}$, can be calculated by applying the following formula:

$$P_{ws} = Q \cdot 10^{\frac{m \cdot T_{ambient}}{T_{ambient} + T_n}}; \quad \text{(equation 3)}$$

wherein Q, m and $T_n$ are the empirically determined constants found in Table 1.

In the context of the present invention, the above identified method of calculating the dew point temperature, $T_{dew\ point}$, should not be considering limiting and it should be understood that any other method of calculation can be applied without departing from the scope of the present invention.

In yet another embodiment according to the present invention, for a more accurate determination, the controller unit 9 comprises the step of calculating the temperature of the oil, $T_{oil}$, on the basis of the working temperature, $t_w$, power, P, of the oil injected compressor 1 and oil mass flow, $\dot{m}$.

Preferably, but not limiting thereto, the power, P, of the oil injected compressor 1 is calculated as a function of the working speed, rpm, of the motor 3 and the working pressure, $p_w$.

Further, the oil mass flow, $\dot{m}$, can be calculated as a function of the working pressure, $p_w$.

Typically, the power of the oil injected compressor 1 can be expressed as a function of the working speed, rpm, and the working pressure, $p_w$, and can be further defined as the heat that needs to be evacuated. Accordingly, the power of the oil injected compressor can be expressed through the following equation:

$$P = \dot{m} \cdot c_p \cdot (t_w - T_{oil}) \quad \text{(equation 4)};$$

wherein, $c_p$ represents the heat capacity of the oil.

In the context of the present invention it should be understood that the power, P, and/or the oil mass flow, $\dot{m}$, can be also measured.

In the context of the present invention, the heat capacity should be understood as a measurable physical quantity, equal to the ratio of the heat added to or removed from the oil, to the resulting temperature change. In other words, the heat capacity, $c_p$, can be expressed as the heat required to raise the temperature of the oil by one degree.

Depending on the oil used, said heat capacity, $c_p$, can be retrieved from specific tables typically provided by the manufacturing companies.

Further, the oil mass flow, $\dot{m}$, can be expressed as a function of the working pressure, $p_w$.

In the context of the present invention, the oil mass flow, $\dot{m}$, should be understood as the mass of oil flowing per unit of time, said unit of time preferably being one second.

As an example, and not limiting thereto, the oil mass flow, $\dot{m}$, can be calculated by solving a second degree mathematical expression, expressed as a function of the working pressure, $p_w$:

$$\dot{m} = A_1 + B_1 \cdot p_w + C_1 \cdot p_w^2 \quad \text{(equation 5)};$$

whereby $A_1$, $B_1$ and $C_1$ are empirically determined constants, characteristic of the compressor element 2.

Further, the power, P, of the oil injected compressor 1, can be calculated by solving a second degree mathematical expression, as a function of the working speed, rpm, and working pressure, $p_w$:

$$P = A_2 + B_2 \cdot \text{rpm} + C_2 \cdot \text{rpm}^2 + p_w \cdot (D_2 + E_2 \cdot \text{rpm} + F_2 \cdot \text{rpm}^2) + p_w^2 \cdot (G_2 + H_2 \cdot \text{rpm} + I_2 \cdot \text{rpm}^2) \quad \text{(equation 6)};$$

whereby the parameters $A_2$ to $I_2$ are empirically determined constants, characteristic of the compressor element 2.

Consequently, the temperature of the oil, $T_{oil}$, can be determined by rewriting equation 4:

$$T_{oil} = t_w - \frac{P}{\dot{m}}; \quad \text{(equation 7)}$$

whereby, for further calculation, the expression of P from equation 6 can be used and the expression of $\dot{m}$ from equation 5 can be used.

In another embodiment according to the present invention, the controller unit 9 can further approximate the temperature of the oil, $T_{oil}$, based on the received measurements.

As an example, and not limiting thereto, said controller unit 9 can approximate the temperature of the oil, $T_{oil}$, as being of approximately the same value as the working temperature, $t_w$, when the oil injected compressor 1 is stopped, or, if said oil injected compressor 1 is running, it can be calculated as a function of the working speed, rpm, and the working pressure, $p_w$, as previously explained.

It should be however understood that any other method of calculating the temperature of the oil, $T_{oil}$, can be implemented, and the present invention should not be limited to the presented example.

In yet another embodiment according to the present invention, the oil separator 7 can further comprise a temperature sensor (not shown) possibly positioned on an oil conduit 21, or within the oil separator 7, in the vicinity of the oil conduit 21. The measurements of such temperature sensor being further sent to the controller unit 9.

Said oil conduit 21 allowing for the oil separated from the compressed air to be re-injected within the compressor element 2.

If said oil separator 7 comprises such a temperature sensor, the controller unit 9 can further consider its measurements as the temperature of the oil, $T_{oil}$.

In another embodiment according to the present invention, for determining the minimum working speed, the controller unit can further express the working temperature, $t_w$, as a function of the working speed, rpm, working pressure, $p_w$, ambient temperature, $T_{ambient}$, the temperature of the oil, $T_{oil}$, and the relative humidity, RH.

Accordingly, the working temperature, $t_w$, can have the following mathematical expression:

$$t_w = A_3 + B_3 \cdot \text{rpm} + C_3 \cdot p_w + D_3 \cdot T_{ambient} + E_3 \cdot T_{oil} + F_3 \cdot RH + G_3 \cdot \text{rpm}^2 + H_3 \cdot p_w^2 \quad \text{(equation 8)};$$

whereby the parameters $A_3$ to $H_3$ are empirically determined constants, characteristic of the compressor element 2.

If we then consider that:

$$t_w = T_{dew\ point} + \text{tolerance} \quad \text{(equation 9)};$$

and introduce equation 9 in equation 8, then equation 8 becomes:

$$G_3 \cdot \text{rpm}^2 + B_3 \cdot \text{rpm} + (A_3 + C_3 \cdot p_w + D_3 \cdot T_{ambient} + E_3 \cdot T_{oil} + F_3 \cdot RH + H_3 \cdot p_w^2 - T_{dew\ point} - \text{tolerance}) = 0 \quad \text{(equation 10)}.$$

By solving this equation, two values of the working speed, rpm, would be calculated. Out of these two calculated values, the minimum working speed, $\text{rpm}_{min}$, is preferably chosen as the lowest value, preferably the lowest positive value.

In the context of the present invention, it should be understood that parameters $A_3$ to $H_3$ are constants characteristic of the compressor element 2, such constants having different values for compressor elements of different capacities, or for different compressors of a different type. Such values being typically determined by the designers of such compressor elements 2.

As an example, and not limiting thereto, the constants $A_1$ to $C_1$ of equation 5, the constants $A_2$ to $I_2$ of equation 6 and the constants $A_3$ to $H_3$ of equation 8, for a variable speed oil injected compressor having 120 liters per second free air delivery, can have the following values:

TABLE 2

| | |
|---|---|
| $A_1$ | $3 \times 10^{-14}$ |
| $B_1$ | 4 |
| $C_1$ | 26 |
| $A_2$ | −6.12 |
| $B_2$ | 6.75 |
| $C_2$ | 0.004 |
| $D_2$ | 0.73 |
| $E_2$ | 0.46 |
| $F_2$ | 0.034 |
| $G_2$ | 0 |
| $H_2$ | 0 |
| $I_2$ | 0 |
| $A_3$ | −0.68 |
| $B_3$ | 5.6 |
| $C_3$ | 0 |
| $D_3$ | 0 |
| $E_3$ | 1 |
| $F_3$ | 0 |
| $G_3$ | 0 |
| $H_3$ | 0 |

Even if the present invention has been presented as suitable to be implemented within an oil injected compressor 1, the possibility of implementing the method of controlling the speed of the motor within a vacuum pump, or the possibility of integrating the controller unit 9 as defined herein within a vacuum pump, should not be excluded.

In case of a vacuum pump, the system as the one shown in FIG. 1 would be similar, the only differences would be: that the compressor element 2 would be replaced by a vacuum element, the air inlet 4 would be connected to a user's network and the outlet conduit 8 would be connected to the atmosphere or to an external network.

The measurements and the processing would be done in the same way as in the case of an oil injected compressor 1.

The present invention is by no means limited to the embodiments described as an example and shown in the drawings, but such a controller unit 9 can be realized in all kinds of variants, without departing from the scope of the invention. Similarly, the invention is not limited to the method of controlling the speed of the motor 3 driving an oil injected compressor 1 described as an example, however, said method can be realized in different ways while still remaining within the scope of the invention.

The invention claimed is:

1. A controller unit for controlling the speed of a motor for driving an oil injected compressor, said controller unit comprising:
   a data connection configured to connect the controller unit with measuring module;
   a first module configured to receive data through said data connection, wherein said data comprises: a measurement of a working pressure of said compressor and a working speed of the motor;
   said first module further being configured to receive a measured or retrieved ambient temperature value;
   a processing unit provided with an algorithm to calculate a minimum working speed of the motor that maintains a temperature of the oil injected compressor above a condensation temperature, said algorithm using at least the measured working pressure, the ambient temperature and a dew point temperature in said calculation;
   a comparator unit configured to compare the calculated minimum working speed with the retrieved working speed of the motor;
   said processing unit further comprising a signal generating unit configured to send a signal to said motor for increasing the working speed of the motor to at least the calculated minimum working speed, if said retrieved working speed is lower than the calculated minimum working speed.

2. The controller unit according to claim 1, wherein the data connection is through a wireless connection.

3. The controller unit according to claim 1, wherein the said data further comprises a working temperature of said compressor, and whereby said algorithm is configured to determine the dew point temperature on the basis of the measured working pressure and temperature.

4. The controller unit according to claim 1, wherein the controller unit is part of the oil injected compressor or is placed in the vicinity of said oil injected compressor.

5. The controller unit according to claim 1, wherein the measuring module comprises a pressure sensor and a temperature sensor positioned at a compressed air outlet of a compressor element part of said oil injected compressor, for retrieving said measured working pressure and working temperature.

6. The controller unit according to claim 1, wherein said controller unit comprises a data connection with the motor driving said oil injected compressor for retrieving said working speed of the motor.

7. The controller unit according to claim 1, wherein said first module comprises a wired or wireless data connection to a temperature sensor positioned in the vicinity of the oil injected compressor or to an internet network providing the ambient temperature measurement in the geographical area where the oil injected compressor is located.

8. The controller unit according to claim 1, wherein the controller unit is configured to receive said measurement of the working pressure, working temperature and the working speed of the motor in real time.

9. The controller unit according to claim 1, wherein said algorithm is further configured to compare the working temperature with a determined dew point temperature.

10. The controller unit according to claim 9, wherein the controller unit is configured to determine the dew point temperature by calculation on the basis of the measured working pressure, the ambient temperature and a retrieved or determined relative humidity.

11. A method of controlling the speed of a motor driving an oil injected compressor, the method comprising at least the following steps:
   measuring a working pressure of the oil injected compressor and sending the measured value to a first module of a controller unit;
   sending the speed of the motor and a measured or retrieved ambient temperature to said first module;
   calculating a minimum working speed of the motor that maintains a temperature of the oil injected compressor above a condensation temperature, wherein said calculating uses the measured working pressure, ambient temperature and a dew point temperature; and
   comparing the calculated minimum working speed with the retrieved working speed of the motor and, if said retrieved working speed is lower than the calculated minimum working speed, increasing the working speed of said motor to at least the calculated minimum working speed.

12. The method according to claim 11, further comprising the steps of measuring a working temperature of the oil injected compressor, sending the measured value to said first module, and determining said dew point temperature on the basis of the measured working pressure and working temperature.

13. The method according to claim 12, further comprising the step of calculating the minimum working speed on the basis of measured working temperature, a temperature of the oil injected in said oil injected compressor and a retrieved or determined relative humidity.

14. The method according to claim 13, further comprising the step of calculating the temperature of the oil on the basis of: the working temperature, power of the oil injected compressor and oil mass flow.

15. The method according to claim 14, wherein the power of the oil injected compressor is calculated as a function of the working speed of the motor and the working pressure.

16. The method according to claim 14, wherein the oil mass flow is calculated as a function of the working pressure.

17. The method according to claim 12, further comprising the step of increasing the working speed of the motor if the working temperature is lower than the dew point temperature to which a tolerance is added.

18. The method according to claim 12, wherein the dew point temperature is calculated on the basis of the working pressure, ambient temperature and the relative humidity.

19. The method according to claim 11, wherein the method applies a sampling rate of 25 Hertz for retrieving the measured working pressure and/or the working temperature, and/or the speed of the motor.

20. The oil injected compressor configured to apply the method of claim 11.

* * * * *